US012609033B2

(12) United States Patent
Takahashi

(10) Patent No.: US 12,609,033 B2
(45) Date of Patent: Apr. 21, 2026

(54) DRIVING ASSISTANCE DEVICE

(71) Applicant: TOYOTA JIDOSHA KABUSHIKI KAISHA, Toyota (JP)

(72) Inventor: Masahiro Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/625,396

(22) Filed: Apr. 3, 2024

(65) Prior Publication Data

US 2024/0339034 A1    Oct. 10, 2024

(30) Foreign Application Priority Data

Apr. 5, 2023    (JP) ................................. 2023-061245

(51) Int. Cl.
| | |
|---|---|
| *G08G 1/16* | (2006.01) |
| *G01S 13/86* | (2006.01) |
| *G01S 13/931* | (2020.01) |
| *G06V 20/56* | (2022.01) |
| *G06V 20/58* | (2022.01) |

(52) U.S. Cl.
CPC ............ *G08G 1/166* (2013.01); *G01S 13/867* (2013.01); *G01S 13/931* (2013.01); *G06V 20/58* (2022.01); *G06V 20/588* (2022.01)

(58) Field of Classification Search
CPC .... G06V 20/58; G06V 20/588; G01S 13/867; G01S 13/931; G01S 2013/93271; G01S 13/862
See application file for complete search history.

(56) References Cited

U.S. PATENT DOCUMENTS

| | | | |
|---|---|---|---|
| 9,969,261 | B2 | 5/2018 | Kodama |
| 10,045,173 | B1 | 8/2018 | Morimura et al. |
| 10,106,157 | B2 | 10/2018 | Sawada et al. |
| 10,150,407 | B2 | 12/2018 | Takahashi et al. |
| 10,696,297 | B2 | 6/2020 | Nguyen Van et al. |
| 11,001,255 | B2 | 5/2021 | Fukuman et al. |
| 11,110,937 | B2 | 9/2021 | Kinoshita et al. |
| 2018/0043890 | A1* | 2/2018 | Keller .................... B60W 30/08 |
| 2019/0001968 | A1* | 1/2019 | Yorifuji .................. B60K 35/22 |
| 2019/0344828 | A1 | 11/2019 | Omori et al. |
| 2019/0389488 | A1 | 12/2019 | Yamada et al. |
| 2020/0238904 | A1* | 7/2020 | Kim ....................... G01S 13/931 |
| 2021/0343148 | A1* | 11/2021 | Lee ....................... G06V 20/588 |
| 2024/0409097 | A1* | 12/2024 | Shimizu ................ B60W 60/00 |

FOREIGN PATENT DOCUMENTS

| | | |
|---|---|---|
| JP | 2022-049189 A | 3/2022 |
| WO | 2023/162560 A1 | 8/2023 |

* cited by examiner

*Primary Examiner* — Sisay Yacob
(74) *Attorney, Agent, or Firm* — Oliff PLC

(57) ABSTRACT

The driving assistance device 1 controls the notification device 30 to issue a predetermined alert to the occupants of the own vehicle if, at a first point in time, it detects the existence of a first driving lane L1 adjacent to the lane L0 in which the own vehicle is traveling, and no stationary object is present in a predetermined area R[n+10] located ahead of the own vehicle in that first driving lane L1, and then, at a second point in time after the first point in time, when the own vehicle is positioned on the side of this predetermined area, it detects the presence of a solid object OB within said area and that the distance Δd between this solid object OB and the own vehicle is less than a threshold.

4 Claims, 4 Drawing Sheets

DRIVING ASSISTANCE DEVICE

BACKGROUND OF THE INVENTION

This invention relates to a driving assistance device that issues a predetermined alert to the occupants of the vehicle when it detects that another vehicle is excessively approaching the own vehicle.

DESCRIPTION OF THE RELATED ART

Devices (dashboard camera (recorder)) equipped with the function to detect whether a solid object exists on the side of the own vehicle have been proposed (see Patent Document 1, for example). The device described in Patent Document 1 (hereinafter, referred to as "conventional device") includes a camera and a processor. The camera captures images of the area on the side of the own vehicle, and based on these images, detects the distance between the solid object located on the side of the own vehicle and the own vehicle. If this distance is less than a threshold, the processor determines that the solid object is a hazardous vehicle and stores the image of the solid object in a storage device.

Patent Document 1: Japanese Unexamined Patent Application Publication No. 2022-49189

SUMMARY

The conventional device may mistakenly determine that an object (a stationary object) located on the side of the vehicle, despite being stationary, is another vehicle (a dangerous vehicle) that is approaching the vehicle excessively.

One objective of the present invention is to provide a driving assistance device capable of accurately detecting (with greater precision than the conventional device) whether a solid object located on the side of the own vehicle is another vehicle excessively approaching the own vehicle.

To solve the above issue, the driving assistance device (1) according to the present invention includes:

A vehicle sensor (20) that acquires information about objects existing around the own vehicle (V), and A processor (10) that controls the own vehicle's notification device (30) to issue a predetermined alert to the occupants of the own vehicle when certain conditions (X, Y) are met, indicating that a solid object positioned on the side of the own vehicle and excessively approaching is another vehicle.

The processor is configured to determine that the condition is met if, at a first point in time, it detects the existence of a first driving lane (L1) adjacent to the lane (L0) in which the own vehicle is traveling, and no stationary object is present in a predetermined area (R) located ahead of the own vehicle in that first driving lane, and then, at a second point in time after the first point in time, when the own vehicle is positioned on the side of this predetermined area, it detects the presence of a solid object (OB) within said area and that the distance between this solid object and the own vehicle is less than a threshold.

When there is a first driving lane, it is presumed that there is no stationary object in a certain area diagonally in front of the own vehicle, and later, when the own vehicle reaches the side of this area, if there is a solid object existing within this area, it is highly likely that this object is another vehicle approaching the own vehicle. Under such circumstances, the driving assistance device according to the present invention issues an alert if the distance between this solid object and the own vehicle is less than a threshold. This prevents alerts from being issued when the own vehicle passes by the side of a stationary object. Thus, the driving assistance device can accurately detect whether a solid object located on the side of the own vehicle is another vehicle excessively approaching the own vehicle, with greater precision than the conventional device.

In one embodiment of the driving assistance device according to the present invention, the processor determines that the condition is met if the width (W[n]) of the first driving lane is greater than or equal to a predetermined value (Wth) and, while the own vehicle is positioned on the side of the predetermined area, the distance ($\Delta$d) between the solid object existing within that area and the own vehicle is less than a first threshold ($\Delta$dth1). If the width of the first driving lane is less than the predetermined value and, while the own vehicle is positioned on the side of the predetermined area, the distance between the solid object existing within that area and the own vehicle is less than a second threshold ($\Delta$dth2), which is smaller than the first threshold, the processor determines that the condition is met.

This embodiment of the driving assistance device assumes that if the width of the first driving lane is above a threshold, the solid object in the predetermined area is presumed to be a four-wheeled vehicle, and if the width is below the threshold, the object is presumed to be a two-wheeled vehicle. The device issues an alert if, when the solid object is presumed to be a four-wheeled vehicle, the lateral distance between the object and the own vehicle is less than the first threshold. If the object is presumed to be a two-wheeled vehicle, an alert is issued if the lateral distance is less than the second threshold, which is smaller than the first threshold. Thus, the driving assistance device sets the threshold for lateral distance between vehicles (either the first or the second threshold) depending on the type of the other vehicle. Assuming the device is configured to issue an alert when the lateral distance is below the first threshold regardless of the type of the other vehicle, there is a risk of unnecessary alerts being issued even when the lateral distance between the own vehicle and a two-wheeled vehicle is maintained at a safe level (lateral distance>second threshold). This embodiment prevents such unnecessary alerts.

In another aspect of the invention, the vehicle sensor includes a front camera (22) that captures the foreground of the own vehicle including the predetermined area to acquire image data. Based on this data, it can determine the presence and width of the first driving lane.

This allows for relatively high accuracy in determining the existence and width of the first driving lane.

In another aspect, the vehicle sensor includes a millimeter-wave radar (21) that acquires information about the solid object within the predetermined area. The processor determines the existence of stationary objects in the area based on information obtained from both the front camera and the millimeter-wave radar.

This allows for more accurate determination of the presence of stationary objects compared to relying solely on the detection results of a single sensor.

DESCRIPTION OF THE EMBODIMENTS

Overview

A driving assistance device 1 according to one embodiment of the present invention is installed in a vehicle V (hereinafter referred to as "own vehicle") equipped with an autonomous driving function. The driving assistance device 1 has a function (approaching vehicle alert function) that issues a predetermined alert to the occupants of the own vehicle when it is determined that a solid object located on the side of the own vehicle and excessively approaching is another vehicle, in situations where the autonomous driving function is deactivated (situations where the driver is actively performing driving operations).
(Specific Configuration)

Figure 1:
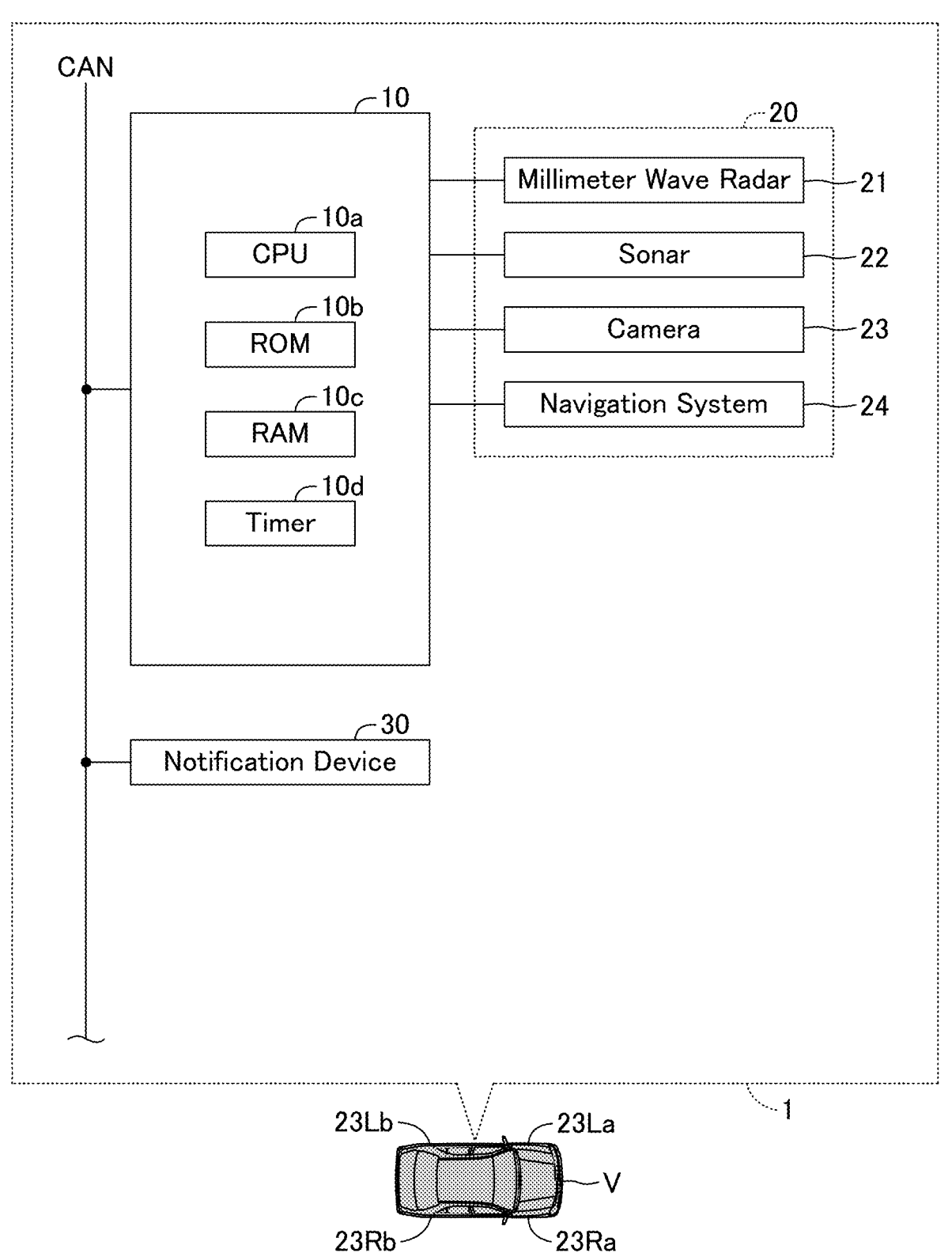
FIG. 1 is a block diagram of a driving assistance device according to one embodiment of the present invention.

As shown in FIG. 1, the driving assistance device 1 includes a driving assistance ECU 10, vehicle sensor (vehicle sensor) 20, and a notification device 30.

The driving assistance ECU 10 includes a microcomputer that comprises a CPU 10a, a ROM 10b (flash ROM), a RAM 10c, etc. The driving assistance ECU 10 is connected to other ECUs installed in the own vehicle via a CAN (Controller Area Network).

The vehicle sensor 20 includes forward sensors and side sensors that acquire information about objects located in front of and to the sides of the own vehicle, respectively. Specifically, the vehicle sensor 20 includes a millimeter-wave radar 21 and a front camera 22 as forward sensors. Additionally, the vehicle sensor 20 includes a sonar 23 as a side sensor.

The millimeter-wave radar 21 is equipped with a transmission/reception part and a signal processing part. The transmission/reception part emits millimeter-wave radio waves (hereinafter referred to as "millimeter waves") to the front of the own vehicle, and receives millimeter waves reflected by a solid object OB. The signal processing part detects the distance between the own vehicle and the solid object OB, the position (direction) of the solid object OB relative to the own vehicle, and the speed of the solid object OB, based on the time from emitting to receiving the millimeter waves, the phase difference between the emitted and received millimeter waves, and the attenuation degree of the reflected waves, and sends these detection results to the driving assistance ECU 10.

Figure 2:
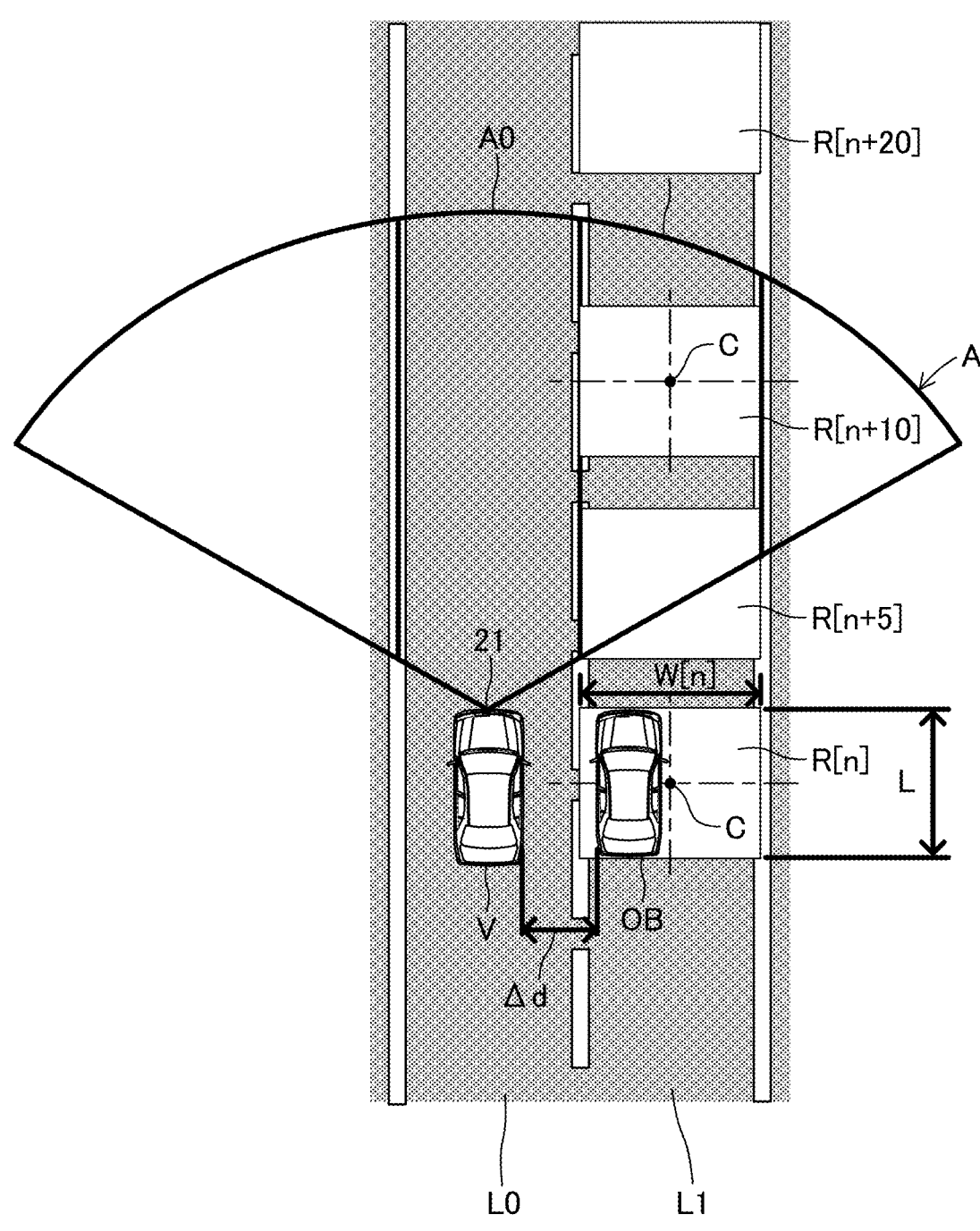
FIG. 2 is a plan view showing the areas for preliminary and final determinations.

As shown in FIG. 2, the area A where the millimeter-wave radar 21 can accurately detect a solid object OB, when viewed from above, is in the shape of a fan with the position of the millimeter-wave radar 21 at the apex, extending forward from this apex. The line connecting the midpoint of the arc to the apex of the fan-shaped area A defined by the millimeter-wave radar 21 almost aligns with the longitudinal axis of the own vehicle. The area A includes area A0 on the driving lane L0 where the own vehicle is traveling, and area A1 on the driving lane L1 adjacent to the driving lane L0. Therefore, the millimeter-wave radar 21 can acquire information (relative position, speed, etc.) about solid objects OB located diagonally in front of the own vehicle.

The front camera 22 includes an imaging device and an image analysis device. The imaging device is a digital camera that incorporates an imaging element made of CCD (charge-coupled device). The imaging device is oriented forward from the front part of the cabin. The imaging device captures the foreground of the own vehicle at a predetermined frame rate and acquires image data. Area A1 is included within the field of view of the front camera 22. The imaging device provides the image data to the image analysis device. The image analysis device analyzes the acquired image data and recognizes the type of solid objects OB located in front of the own vehicle (other vehicles, signs indicating construction zones, etc.) from the images. Furthermore, the image analysis device analyzes the image data to recognize the existence and width W (length in the transverse direction) of the driving lane L1 (the driving lane adjacent to the driving lane L0 where the own vehicle is traveling). The image analysis device transmits the recognition results to the driving assistance ECU 10.

Here, when the image analysis device recognizes the existence of driving lane L1, it sets multiple rectangular areas R[0], R[1], R[2] . . . shifted in the longitudinal direction in the plan view of driving lane L1. The width W[n] of each area R[n] is the same as the width of driving lane L1. The longitudinal length L of area R[n] is equivalent to the total length of the own vehicle. Area R[0] is arranged in order from the beginning (the area closest to the own vehicle at the time when the image analysis device recognizes the existence of driving lane L1) to the end (the end part in the direction away from the own vehicle) of driving lane L1 as area R[0], R[1], R[2] . . . , up to R[max]. The shift in the longitudinal direction between two adjacent areas R[n] and R[n+1] is, for example, "1 meter," and parts of these two areas overlap. Although FIG. 2 illustrates an example where driving lane L1 exists on the right side of the driving lane L0 in which the own vehicle is traveling, multiple areas R[0], R[1], . . . are set on driving lane L1 even when it exists on the left side of driving lane L0.

The image analysis device analyzes the image data to determine whether the own vehicle is positioned to the side of area R[n] (whether the center of gravity of the own vehicle is positioned to the side of the center C of area R[n]) and transmits the determination result to the driving assistance ECU 10. At the time when the own vehicle is positioned to the side of area R[n], the said area R[n] and its neighboring areas (several areas in front of area R[n]) are located outside the angle of view of the imaging device. At this time, the image analysis device can accurately recognize areas such as R[n+5] to R[n+20]. The image analysis device recognizes that the own vehicle is positioned to the side of area R[n] when area R[n+5] is positioned at a predetermined location in the captured image.

Furthermore, the image analysis device calculates the direction and distance of area R[n+10], which it can accurately recognize when the own vehicle is positioned to the side of area R[n] at that time, and transmits the calculation result to the driving assistance ECU 10. Also, when the image analysis device detects the end of driving lane L1, it transmits the recognition result of area R[max] closest to the end (the index of the end area, "max") to the driving assistance ECU 10. The range of areas that the image analysis device can accurately recognize is an example, and this range may expand or contract depending on the performance of the imaging device.

When the own vehicle is positioned to the side of area R[n], area R[n+10] is included in area A1 of the detection area A of the millimeter-wave radar 21. Therefore, under the condition where the own vehicle is positioned to the side of area R[n], the millimeter-wave radar 21 can acquire information about the solid object OB located in area R[n+10] (for example, the shape, type, speed v0 of the solid object OB).

The sonar 23, as shown in FIG. 1, is equipped with transmitting and receiving parts 23La, 23Ra, and transmitting and receiving parts 23Lb, 23Rb, along with a signal analysis part. The transmitting and receiving part 23La is located on the front part of the left side of the own vehicle and directed to the left. The transmitting and receiving part 23Ra is located on the front part of the right side of the own vehicle and directed to the right. The transmitting and receiving part 23Lb is located on the rear part of the left side of the own vehicle and directed to the left. The transmitting and receiving part 23Rb is located on the rear part of the right side of the own vehicle and directed to the right. Each transmitting and receiving part emits ultrasonic waves intermittently, receiving ultrasonic waves (reflected waves) reflected by the solid object OB. Then, each transmitting and receiving part provides the signal (reflected wave signal) representing the received reflected waves to the signal analysis part.

The signal analysis part analyzes the reflected wave signals obtained from each transmitting and receiving part to calculate the position (distance and direction) of the solid object OB relative to the own vehicle. Then, the signal analysis part transmits these calculation results to the driving assistance ECU 10.

The notification device 30 includes an image display device and an acoustic device. The notification device 30, for example, is incorporated into the instrument panel of the own vehicle. The image display device displays a predetermined image (for example, an image indicating the presence of an approaching other vehicle) in accordance with an image display command acquired from the driving assistance ECU 10. Furthermore, the acoustic device plays a predetermined alert sound (beep sound) in accordance with an alert playback command acquired from the driving assistance ECU 10.

(Other Vehicle Approach Alarm Function)

The driving assistance device 1, as will be described in detail later, issues a predetermined alert to the occupants of the own vehicle when a certain condition (hereinafter referred to as "approach alert start condition") for determining that a solid object located on the side of the own vehicle is an other vehicle that has excessively approached the own vehicle is met.

By the way, it is assumed that in the area in the driving lane L1 adjacent to the driving lane L0 in which the own vehicle is traveling, there is no stationary object in the area R diagonally in front of the own vehicle, and then, when the own vehicle reaches the side of the area R, there exists a solid object OB in the area R. In this situation, since there exists a solid object OB in the area R where no stationary object exists, it is highly likely that the solid object OB is an other vehicle that has approached the own vehicle. Therefore, the driving assistance device 1 issues an alert to the occupants of the own vehicle when the distance Δd (lateral vehicle distance) between the solid object OB (object presumed to be another vehicle) and the own vehicle is relatively small. That is, the driving assistance device 1 issues an alert when the distance Δd is less than a threshold Δdth (the minimum vehicle distance necessary for safe travel of the own vehicle and the other vehicle). The minimum vehicle distance between a two-wheeled vehicle (motorcycle) and the own vehicle is smaller than that between a four-wheeled vehicle and the own vehicle. Therefore, the driving assistance device 1 decides whether to issue an alert not only based on the distance Δd but also depending on the type of the other vehicle (two-wheeled vehicle or four-wheeled vehicle).

Specifically, the driving assistance ECU 10, as described below, makes a preliminary determination (executes a preliminary judgment) on whether there is a stationary object in the area R[n+10] under the situation where the own vehicle is located on the side of the area R[n]. Then, when the own vehicle progresses to the side of the area R[n+10], it makes a final determination (executes a final judgment) on the existence of the solid object OB in the area R[n+10]. In the following description, the result of the preliminary determination is referred to as "preliminary judgment result," and the result of the final determination is referred to as "final judgment result." The driving assistance ECU 10 determines that the approach alert start condition has been met if condition X related to the preliminary judgment result and the final judgment result is satisfied, and also if condition Y related to the width W of the driving lane L1 and the distance Δd between the own vehicle and the solid object OB is satisfied.

Specifically, the driving assistance ECU 10, based on the information acquired from the front sensor (front camera 22), executes the following preliminary judgment if it detects that the own vehicle is located on the side of one of the areas R[0], R[1], . . . , R[max−10]. That is, the driving assistance ECU 10, under the situation where the own vehicle is located on the side of the area R[n] (the center of gravity of the own vehicle is on the side of the center C of the area R[n]), acquires information from the front sensor (millimeter-wave radar 21 and front camera 22) and makes a determination on whether there is a stationary object (solid object OB with velocity v0 being "0") in the area R[n+10] (either "with stationary object" or "without stationary object"). The driving assistance ECU 10 stores the determination result (preliminary judgment result) as the preliminary judgment result PD[n+10] in the RAM 10c (or ROM 10b). In addition, if the driving assistance ECU 10 determines that there is no stationary object in the area R[n+10], it acquires the width W[n+10] (width of the driving lane L1) of the area R[n+10] based on the information acquired from the front camera 22. Then, the driving assistance ECU 10 stores not only the preliminary judgment result PD[n+10] but also the width W[n+10] in the RAM 10c (or ROM 10b).

Furthermore, the driving assistance ECU 10, based on the information acquired from the front sensor (front camera 22), reads out the preliminary judgment result PD[n] (that is, the result of the preliminary judgment conducted at a point "10 meters" before the current location) from RAM 10c (or ROM 10b) when it detects that the own vehicle is located on the side of any one of the areas R[10], R[11], . . . , R[max]. If the preliminary judgment result PD[n] is "without stationary object," the driving assistance ECU 10 executes the following final judgment. That is, the driving assistance ECU 10 determines whether there is a solid object OB in the area R[n] (either "with solid object" or "without solid object") based on the information acquired from the sonar 23. If the final judgment result is "with solid object," the driving assistance ECU 10 determines that condition X is met. Thus, condition X is met when the preliminary judgment result PD[n] is "without stationary object" and the final judgment result FD[n] is "with solid object." On the other hand, condition X is not met if the preliminary judgment result PD[n] is "with stationary object" or if the final judgment result FD[n] is "without solid object."

Under the situation where the own vehicle is located on the side of any one of the areas R[10], R[11], . . . , R[max] (that is, an area where a preliminary judgment has been conducted), the driving assistance ECU 10, if it has determined that condition X is met, acquires the distance Δd between the solid object OB and the side of the own vehicle based on the information from the sonar 23. Furthermore, the driving assistance ECU 10 reads out the width W[n] (width of the driving lane L1) from RAM 10$c$ (or ROM 10$b$). The driving assistance ECU 10 determines whether the width W[n] is greater than or equal to the threshold width Wth (for example, "3 meters"). If the driving assistance ECU 10 determines that the width W[n] is greater than or equal to the threshold Wth, it presumes that the solid object OB is a four-wheeled vehicle. In this case, the driving assistance ECU 10 determines whether the distance Δd is less than threshold Δdth1 (for example, 1 meter). If the driving assistance ECU 10 determines that the distance Δd is less than threshold Δdth1, it determines that condition Y is met. On the other hand, if the driving assistance ECU 10 determines that the width W[n] is less than the threshold Wth, it presumes that the solid object OB is a two-wheeled vehicle. In this case, the driving assistance ECU 10 determines whether the distance Δd is less than a smaller threshold Δdth2 (for example, 50 centimeters). If the driving assistance ECU 10 determines that the distance Δd is less than threshold Δdth2, it determines that condition Y is met. Thus, condition Y is met either "if the width W[n] is greater than or equal to the threshold Wth and the distance Δd is less than threshold Δdth1" or "if the width W[n] is less than the threshold Wth and the distance Δd is less than threshold Δdth2."

The driving assistance ECU 10 determines that the approach alert start condition is satisfied if both condition X and condition Y are met. When the driving assistance ECU 10 determines that the approach alert start condition is satisfied, it controls the notification device 30 to issue a predetermined alert to the occupants of the own vehicle. Specifically, the driving assistance ECU 10 causes the image display device of the notification device 30 to display a predetermined image and the acoustic device of the notification device 30 to play a predetermined alert sound (beep sound). After a predetermined period of time has passed since the start of the alert, the driving assistance ECU 10 terminates the alert.

Next, with reference to FIGS. 3 and 4, the programs PR1 and PR2 executed by the CPU 10$a$ (hereinafter simply referred to as "CPU") to realize the other vehicle approach alert function will be explained.

Figure 3:
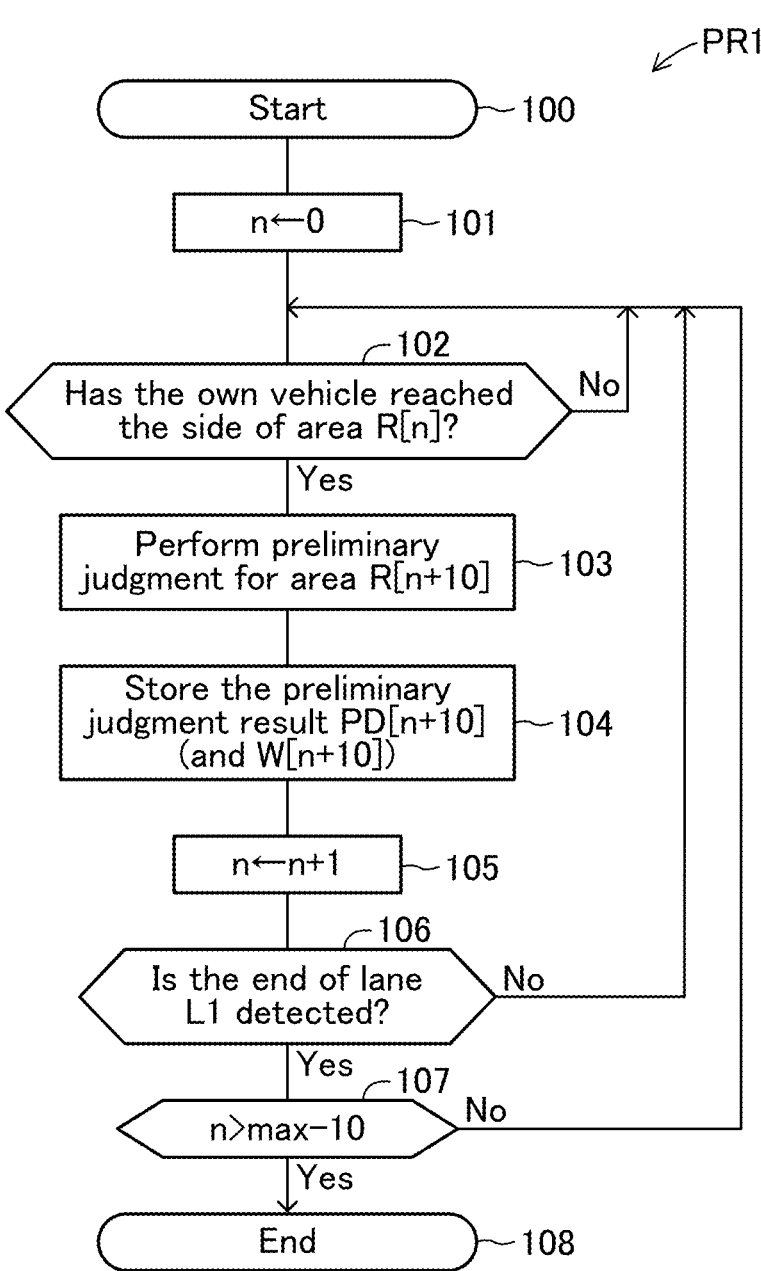
FIG. 3 is a flowchart of the first program for realizing the approaching vehicle alert function.
Figure 4:
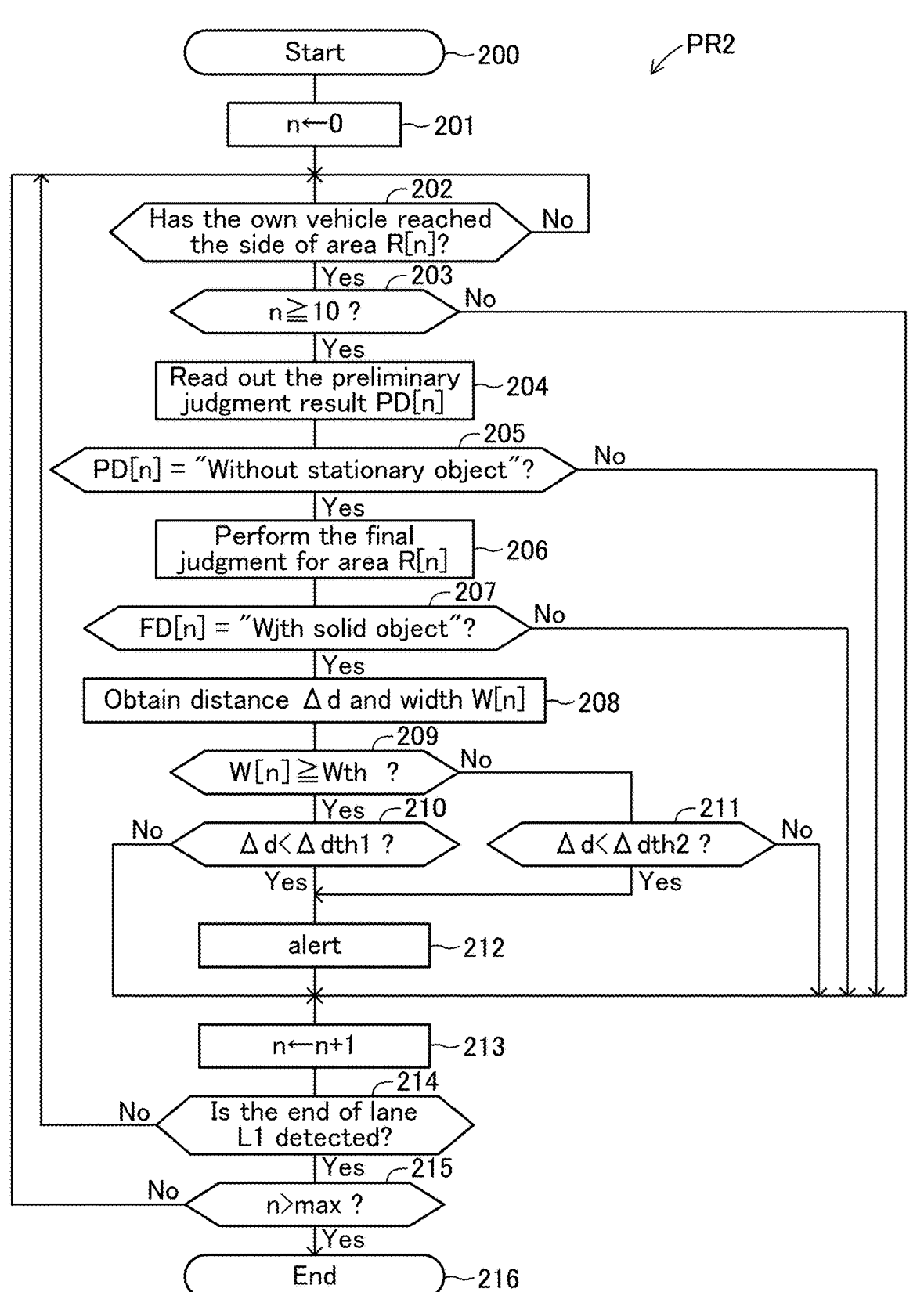
FIG. 4 is a flowchart of the second program for realizing the approaching vehicle alert function.

The CPU, based on the information acquired from the front sensor while the own vehicle is moving forward, begins the execution of both programs PR1 and PR2 shown in FIGS. 3 and 4 when it detects the driving lane L1. In the midst of executing programs PR1 and PR2, the image analysis device of the front camera 22, upon detecting area R[max] (that is, the end of driving lane L1), transmits "max," which is the identification information (index) for area R[max], to the CPU.

(Program PR1)

CPU starts the execution of program PR1 from step 100 and proceeds to step 101.

At step 101, CPU performs initialization processing. Specifically, CPU sets "n," which is the index for selecting one of the areas R[0], R[1], . . . , R[max], to "0." Then, CPU proceeds to step 102.

At step 102, CPU determines whether the own vehicle has reached the side of area R[n] based on the information acquired from the front sensor. If CPU determines that the own vehicle has reached the side of area R[n] (102: Yes), it proceeds to step 103. Otherwise, if CPU does not determine that the own vehicle has reached the side of area R[n] (102:

No), it returns to step 102. In other words, CPU repeats step 102 until the own vehicle reaches the side of area R[n].

At step 103, CPU performs a preliminary judgment for area R[n+10]. That is, CPU acquires the preliminary judgment result PD[n+10] (the presence or absence of a stationary object (and width W[n+10])) based on the information obtained from the millimeter-wave radar 21 and the front camera 22. Then, CPU proceeds to step 104.

At step 104, CPU stores the preliminary judgment result PD[n+10] (and width W[n+10]) in RAM 10$c$ (or ROM 10$b$). Then, CPU proceeds to step 105.

At step 105, CPU adds "1" to "n." That is, CPU updates the target of the preliminary judgment to the next area R[n+11]. Then, CPU proceeds to step 106.

At step 106, CPU determines whether it has already detected the end of the driving lane L1. That is, CPU determines whether it has already acquired "max," which is the index for area R[max], from the front camera 22. If CPU determines that it has detected the end of driving lane L1 (106: Yes), it proceeds to step 107. Otherwise, if CPU has not detected the end of driving lane L1 (106: No), it returns to step 102.

At step 107, CPU determines whether the index "n" for the target area R[n] is greater than "max," which is the index for the end area R[max] of driving lane L1. If "n" is greater than "max" (107: Yes), CPU determines that there is no area R[n] to be the target of the preliminary judgment and proceeds to step 108, where it ends the execution of program PR1. On the other hand, if "n" is less than or equal to "max" (107: No), CPU determines that there is an area R[n] to be the target of the preliminary judgment and returns to step 102.

(Program PR2)

CPU starts the execution of program PR2 from step 200 and proceeds to step 201.

At step 201, CPU performs initialization processing. Specifically, CPU sets "n," which is the index for selecting one of the areas R[0], R[1], . . . , R[max], to "0." Then, CPU proceeds to step 202.

At step 202, the CPU determines whether the own vehicle has reached the side of area R[n] based on the information acquired from the front sensor. If the CPU determines that the own vehicle has reached the side of area R[n] (202: Yes), it proceeds to step 203. Otherwise, if the CPU does not determine that the own vehicle has reached the side of area R[n] (101: No), it returns to step 202. In other words, the CPU repeats step 202 until the own vehicle reaches the side of area R[n].

As mentioned above, while executing program PR1, the CPU sequentially performs preliminary judgments for area R[10] and each area in front of it (R[11], R[12], . . . ) but does not perform preliminary judgments for areas R[0] to R[9]. Therefore, at step 203, the CPU determines whether a preliminary judgment has been conducted for the area R[n] on the side of the own vehicle (whether "n" is 10 or greater). If the CPU determines that a preliminary judgment has been conducted for area R[n] (n≥10) (203: Yes), it proceeds to step 204. Otherwise, if the CPU does not determine that a preliminary judgment has been conducted for area R[n] (203: No), it proceeds to step 213, which will be described later.

At step 204, the CPU reads out the preliminary judgment result PD[n] for the area R[n] on the side of the own vehicle from RAM 10$c$ (or ROM 10$b$). Then, it proceeds to step 205.

At step 205, the CPU determines whether the preliminary judgment result PD[n] is "without stationary object". If the CPU determines that the preliminary judgment result PD[n]

is "without stationary object" (205: Yes), it proceeds to step 206. Otherwise, if the CPU does not determine that the preliminary judgment result PD[n] is "without stationary object" (205: No), it proceeds to step 213, which will be described later.

At step 206, the CPU performs the final judgment for area R[n]. That is, based on the information acquired from the sonar 23, the CPU determines whether there is a solid object OB in area R[n].

At step 207, the CPU determines whether the final judgment result FD[n] for area R[n] is "with solid object". If the CPU determines that the final judgment result FD[n] is "with solid object" (207: Yes), it proceeds to step 208. Otherwise, if the CPU does not determine that the final judgment result FD[n] is "with solid object" (208: No), it proceeds to step 213.

At step 208, the CPU acquires the distance $\Delta d$ between the solid object OB and the side of the own vehicle from sonar 23, and reads out W[n] from RAM 10$c$ (or ROM 10$b$). Then, it proceeds to step 209.

At step 209, the CPU determines whether the width W[n] is greater than or equal to the threshold Wth. If the CPU determines that the width W[n] is greater than or equal to the threshold Wth (209: Yes), it proceeds to step 210. Otherwise, if the CPU does not determine that the width W[n] is greater than or equal to the threshold Wth (209: No), it proceeds to step 211.

At step 210, the CPU determines whether the distance $\Delta d$ is less than the threshold $\Delta dth1$. If the CPU determines that the distance $\Delta d$ is less than the threshold $\Delta dth1$ (210: Yes), it proceeds to step 212. Otherwise, if the CPU does not determine that the distance $\Delta d$ is less than the threshold $\Delta dth1$ (210: No), it proceeds to step 213.

At step 211, the CPU determines whether the distance $\Delta d$ is less than the threshold $\Delta dth2$ ($<\Delta dth1$). If the CPU determines that the distance $\Delta d$ is less than threshold $\Delta dth2$ (211: Yes), it proceeds to step 212. Otherwise, if the CPU does not determine that the distance $\Delta d$ is less than threshold $\Delta dth2$ (210: No), it proceeds to step 213.

At step 212, the CPU controls the notification device 30 to issue a predetermined alert to the occupants of the own vehicle. Then, it proceeds to step 213.

At step 213, the CPU adds "1" to "n." That is, the CPU updates the target for the final judgment to the area R[n+1]. Then, it proceeds to step 214.

At step 214, the CPU determines whether it has already detected the end of the driving lane L1. That is, the CPU determines whether it has already acquired "max," which is the index for area R[max], from the front camera 22. If the CPU determines that it has detected the end of driving lane L1 (214: Yes), it proceeds to step 215. Otherwise, if the CPU has not detected the end of driving lane L1 (214: No), it returns to step 202.

At step 215, the CPU determines whether the index "n" for the target area R[n] is greater than "max," which is the index for the end area R[max] of driving lane L1. If "n" is greater than "max" (215: Yes), the CPU determines that there is no area R[n] to be the target of the final judgment and proceeds to step 216, where it ends the execution of program PR2. On the other hand, if "n" is less than or equal to "max" (215: No), the CPU determines that there is an area R[n] to be the target of the final judgment and returns to step 202.

At step 216, the CPU ends the execution of program PR2.
(Effect)

In the case where the driving lane L1 exists, it is assumed that there is no stationary object in the area diagonally in front of the own vehicle and then, when the own vehicle reaches the side of that area, a solid object OB exists within the area. In this situation, it is highly likely that the solid object OB is another vehicle that has approached the own vehicle. The driving assistance device 1 issues an alert when the distance $\Delta d$ is relatively small under this situation. Accordingly, it is possible to suppress the issuance of an alert when the own vehicle passes by the side of a stationary object. Thus, the driving assistance device 1 can detect with high precision (more accurately than conventional devices) whether a solid object located on the side of the own vehicle is another vehicle that has excessively approached the own vehicle.

Furthermore, driving assistance device 1 estimates that a solid object OB is a four-wheeled vehicle if the width W[n] is greater than or equal to the threshold Wth, and estimates that a solid object OB is a two-wheeled vehicle if the width W[n] is less than the threshold Wth. When driving assistance device 1 estimates that the solid object OB is a four-wheeled vehicle, it issues an alert if the distance $\Delta d$ is less than the threshold $\Delta dth1$. When it estimates that the solid object OB is a two-wheeled vehicle, it issues an alert if the distance $\Delta d$ is less than a smaller threshold $\Delta dth2$ (less than $\Delta dth1$). Thus, driving assistance device 1 sets the threshold $\Delta dth$ ($\Delta dth1$ or $\Delta dth2$) according to the type of other vehicle. Assuming that the driving assistance device is configured to issue an alert when the distance $\Delta d$ is less than the threshold $\Delta dth1$, regardless of the type of other vehicle, there is a risk that an alert may be issued even when the distance $\Delta d$ is maintained at a safe level for travel between the own vehicle and the two-wheeled vehicle ($\Delta d > \Delta dth2$). According to this embodiment, such unnecessary alerts are suppressed.

The present invention is not limited to the above embodiments and can adopt various modifications within the scope of the invention.
(Modification 1)

The vehicle sensor 20 may include a navigation system 24 (refer to FIG. 1). The navigation system 24 receives GPS signals from multiple satellites and detects the current location (latitude and longitude) of the own vehicle based on the received GPS signals. Moreover, the navigation system 24 stores map data representing a map. The map data includes road information representing roads (for example, the number of driving lanes constituting a road, the width of each driving lane, etc.). The driving assistance ECU 10 may acquire information such as the existence of driving lane L1, the width W[n] of area R[n], and the relative position (direction and distance) between area R[n], area R[n+10], and the own vehicle based on the information obtained from the navigation system 24.
(Modification 2)

The manner of alerting the occupants of the own vehicle is not limited to the manner of the above embodiments. For example, the alert could involve vibrating the steering wheel.

What is claimed is:

1. A driving assistance device comprising:
   a front detecting sensor configured to acquire information about objects in front of an own vehicle and a current lane in which the own vehicle is traveling;
   an object distance sensor configured to detect a lateral object distance between a solid object in a lane adjacent to the current lane and the own vehicle;
   a memory; and
   a processor operatively coupled to the front detecting sensor and the object distance sensor, the processor being programmed to:

define a target area in the lane adjacent to the current lane that is a predetermined distance ahead of the own vehicle in the a traveling direction;

perform a first determination step at a first point in time before the own vehicle has reached a lateral side of the target area that no stationary object is present in the target area;

store a result of the first determination step in the memory;

after the own vehicle has reached the lateral side of the target area, perform a second determination step at a second point in time after the first point in time whether a solid object exists in the target area;

upon a determination in the second determination step that a solid object exists in the target area, determine a lateral distance to the solid object using the object distance sensor;

based on the determined lateral distance, determine whether the solid object is an approaching other vehicle; and upon a determination that the solid object is an approaching other vehicle, output a predetermined alert to an operator of the own vehicle.

2. The driving assistance device according to claim 1, wherein the processor is programmed to:

perform the second determination when it is determined that a width of the adjacent lane is greater than a predetermined value and the distance between the solid object existing in the target area and the own vehicle is less than a first threshold while the own vehicle is positioned on the side of the target area, and determine that that the solid object is an approaching other vehicle if the width of the adjacent lane is less than the predetermined value and the distance between the solid object existing in the target area and the own vehicle is less than a second threshold, which is smaller than the first threshold, under a condition where the own vehicle is positioned on the side of the target area.

3. The driving assistance device according to claim 2, wherein the front detecting sensor includes a front camera that captures a foreground of the own vehicle including the target area to acquire image data, and based on the acquired image data, can acquire the existence and the width of the adjacent lane.

4. The driving assistance device according to claim 3, wherein the front detecting sensor includes a millimeter-wave radar that acquires information about the solid object within the target area, and the processor is programmed to determine the existence of the stationary object within the target area based on the information acquired by the front camera and the millimeter-wave radar.

\* \* \* \* \*